July 26, 1932.   G. S. FULCHER   1,868,699
METHOD OF MAKING COMPOSITE REFRACTORY ARTICLES
Filed Oct. 15, 1928

INVENTOR
Gordon S. Fulcher.
BY
ATTORNEYS.

Patented July 26, 1932

1,868,699

UNITED STATES PATENT OFFICE

GORDON S. FULCHER, OF CORNING, NEW YORK, ASSIGNOR TO CORNING GLASS WORKS, OF CORNING, NEW YORK, A CORPORATION OF NEW YORK

METHOD OF MAKING COMPOSITE REFRACTORY ARTICLES

Application filed October 15, 1928. Serial No. 312,659.

This invention relates to composite refractory articles and the method of making them and more particularly to refractory articles for use in glass manufacture.

Various types of tank blocks and other refractory articles have, from time to time, been produced with a view to resisting the corrosive attack of molten glass. Clay refractories are those most commonly used for such purposes but owing to the corrosive attack of the molten glass on such refractories, frequent and costly repairs to glass tanks must be made when such refractories are used. I have found that cast refractory blocks, such as shown and described in United States Letters Patent 1,615,750 issued to me on January 25, 1927, are better suited to withstanding the corrosive action of molten glass.

It is well known that the attack of molten glass on the refractory lining of glass melting tanks varies in different parts; for example, with ordinary lime glass the attack is usually most severe at the glass line and is relatively slight on the bottom. Hence, a one inch layer of cast refractory on the bottom of such a tank will in many cases last as long as eight inches or more at the glass line. Because of the high thermal conductivity of cast refractory material, it is desirable to use no more of it than is necessary to resist corrosion, that is to use relatively thin layers to line certain parts of a tank; however, owing to the method of producing such material it is relatively difficult and expensive to make thin castings.

It is an object of the present invention to produce blocks possessing the low thermal conductivity characteristic of clay refractories yet having the corrosive resistant properties of cast refractories.

Another object is to lighten and cheapen the construction of corrosive resistant walls of glass melting tanks.

A further object is to improve the resistance to thermal shock of thin cast refractory articles.

The above and other objects may be attained by the use of my invention which embodies among its features the production of a composite refractory article consisting of a cast refractory layer fused to a sintered refractory body.

Figure 1:
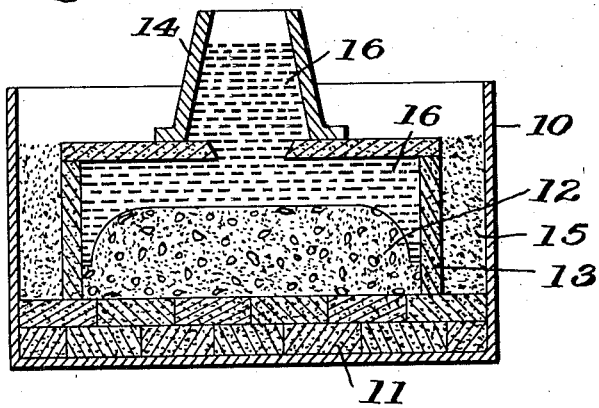
Fig. 1 is a longitudinal sectional view through a mold container showing a mold therein, the latter including a refractory backing member and being filled with liquid refractory material.
Figure 2:
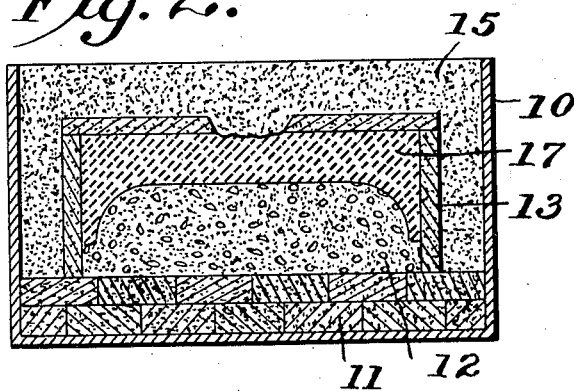
Fig. 2 is a sectional view similar to Fig. 1 showing the mold completely filled with the refractory material after it has wholly solidified, and the font removed.

In carrying out my invention for producing a composite tank block, I provide a mold container 10 with a layer of refractory bricks 11 and support a previously formed clay backing member 12 thereon. I then place a sand mold member 13 around the backing member and support a font mold 14 on the mold member 13. The space between the mold and the mold container is then filled with insulating material 15, such as sil-o-cel powder, and molten refractory material 16 is poured into the mold member 13 through the font mold 14 to completely fill the space between the walls of the mold member 13 and the backing member 12. The font mold 14 is also filled to provide a reserve supply of molten refractory material which will feed into the mold as its contents solidify and shrink. The molten refractory material when solidified produces a facing 17 which will successfully withstand the corrosive attack of molten glass.

After the casting has completely solidified, the font is cracked off and removed, and the composite block is covered with insulating material and left to cool slowly so that it may anneal itself and remain free from serious cracks.

In the case of thin articles which contain insufficient heat to prevent them from cooling too fast, it is necessary to supply additional heat in order to anneal them. This may be done by placing them in an annealing kiln, but I have found it more convenient to embed them in the hot insulating powder on top of a recently poured cast refractory tank block.

In order to secure a satisfactory bond between the backing member 12 and the molten refractory material 16, unless the backing member is formed of a material having a very low fusing point, I have found it necessary to pour the molten material onto the backing member while the latter is hot. The clay member used may have been previously burned and then preheated to the desired temperature. I have also found it satisfactory to heat an unburned clay member to the proper temperature and transfer it while hot directly from the kiln to the mold container. The sintering and burning of the backing member in this case is completed by heat supplied by the cast material. In either event when ordinary clay refractory material is used in producing the backing member 12 I have found that a satisfactory bond may be secured if the backing member is heated to a temperature of about 1000° C.

Figure 5:
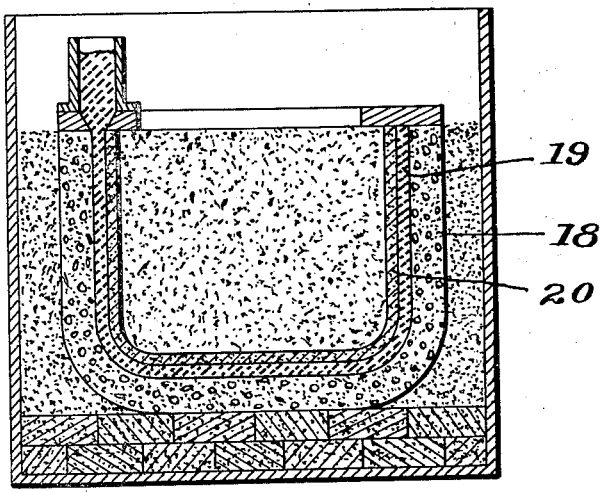
Fig. 5 is a sectional view through a glass-containing pot, all made in accordance with this invention.
Figure 3:
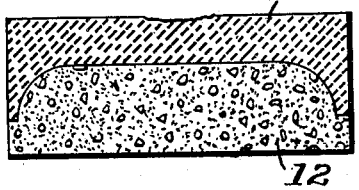
Fig. 3 is a sectional view of a completed bottom block.
Figure 4:
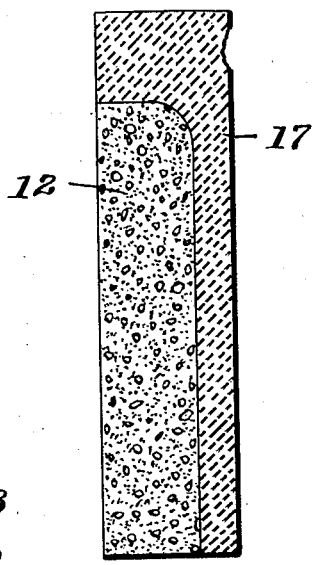
Fig. 4 is a vertical sectional view through a side-wall block.

In Fig. 5, I have illustrated my method for producing a glass-containing pot which consists of a bowl shaped backing member 18 having a facing 19 of cast refractory material. This type of article may be produced by forming the backing member in any desired manner, preheating it, and then supporting a mold member 20, having a contour corresponding to the shape of the finished article, in spaced relation to the backing member, and pouring liquid refractory material into the space between the backing member and mold member to completely fill it. The annealing of the article may be accomplished as above set forth or by placing the article in a suitable annealing kiln while it is still hot.

While throughout the specification I refer to clay backing members, it is obvious that the backing members may be made by completely or partially sintering any refractory material having properties suitable for the purpose.

A suitable mold may be made by cementing together slabs composed of glass sand bonded with sodium silicate. This precludes the disintegration or burning out of the mold before the cast material has solidified, and hence contributes to the successful production of perfect castings.

By the term "cast refractory" as herein used, I mean a refractory material which is produced by the fusion of its constituents, usually in an electric furnace, and the pouring of it into a mold while in its liquid state, as fully described in the patent referred to herein. Such material differs in microscopic structure from refractory material produced by sintering.

While I have shown and described in this application only certain refractory articles, it is to be understood that the process may be succesfully used in the production of other types of articles, such as crucibles, feeder bowls, and similar intricate shapes where a relatively thin coating of corrosive-resistant refractory is sufficient to withstand the attack of molten glass, but does not possess the desired resistance to thermal shock or provide the desired thermal insulating qualities, and that minor changes in the details of procedure may be resorted to without departing from the spirit and scope of the invention as defined in the appended claims.

I claim:

1. The herein described method of making refractory articles for use in contact with molten glass which includes placing an unburned refractory backing member in a mold and introducing into the mold molten aluminum silicate which due to its own heat will fuse with said backing member.

2. The herein described method of making composite refractory articles for use in contact with molten glass which consists in placing an unburned backing member in a mold, introducing into the mold molten aluminum silicate which due to its own heat will fuse with the backing member, and annealing the article.

3. The herein described method of making refractory articles for use in contact with molten glass which includes placing an unburned refractory backing member so as to form a part of a mold and introducing into the mold molten aluminum silicate which due to its own heat will fuse with said backing member.

4. The herein described method of making composite refractory articles for use in contact with molten glass which includes preheating an unburned refractory backing member, placing it so as to form a part of a mold and introducing into the mold liquid aluminum silicate which due to its own heat will fuse with said backing member.

5. The herein described method of making composite refractory articles for use in contact with molten glass which consists in forming an unburned refractory backing member, preheating it and placing it so as to form a part of a mold, pouring into the mold molten aluminum silicate which due to its own heat will fuse to the backing member and burn it hard, and annealing the article.

GORDON S. FULCHER.